Figure 1:
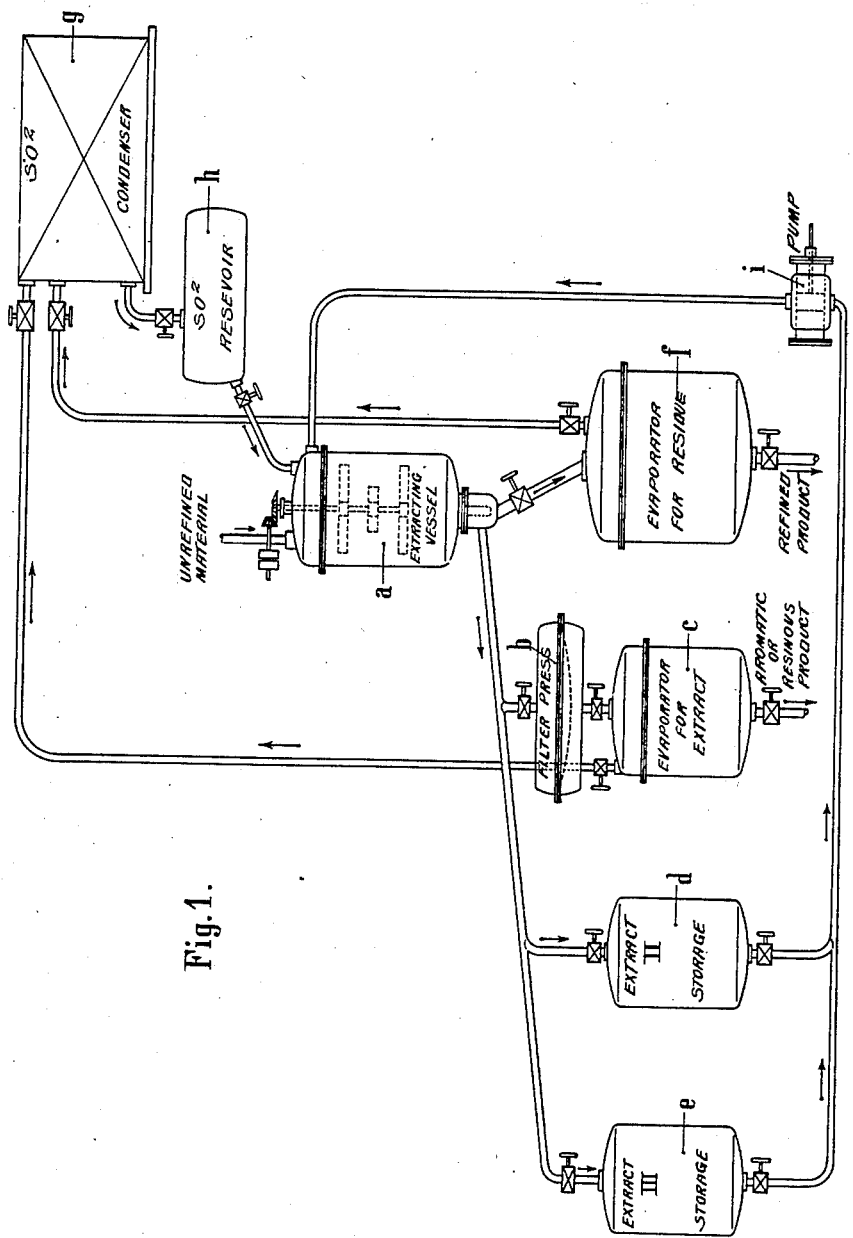

Feb. 17, 1925. 1,526,665

L. EDELEANU ET AL

PROCESS OF PURIFICATION OF HYDROCARBONS

Filed June 21, 1922 2 Sheets-Sheet 1

Inventors:
L. Edeleanu,
Wilhelm Hess,
by Emery, Booth, Janney & Varney
Attys.

Patented Feb. 17, 1925.

1,526,665

UNITED STATES PATENT OFFICE.

LAZAR EDELEANU, OF CHARLOTTENBURG, AND WILHELM HESS, OF LICHTERFELDE, GERMANY.

PROCESS OF PURIFICATION OF HYDROCARBONS.

Application filed June 21, 1922. Serial No. 569,921.

*To all whom it may concern:*

Be it known that we, LAZAR EDELEANU, a citizen of Rumania, and resident of Charlottenburg, Germany, and WILHELM HESS, a citizen of the Republic of Germany, and resident of Lichterfelde, Germany, have invented an Improvement in Processes of Purification of Hydrocarbons, of which the following description is a specification, like characters on the drawings representing like parts.

We do hereby declare the nature of this invention and in what manner the same is to be performed, to be particularly described in and by the following statement:

This invention relates to a process for the separation of hydrocarbons readily soluble in liquid sulphurous acid from hydrocarbons which are soluble with difficulty or insoluble in liquid sulphurous acid (sulphur dioxide), which as is known, effects an efficient purification from undesired ingredients.

In the purification of mineral oils with a high boiling point by means of the usual sulphurous acid process, such, for example, as that described in United States Patent No. 911,553, the resinifying materials contained in heavy mineral oils can only be completely removed by repeated extractions with the help of fresh liquid sulphurous acid. Apart from the fact that the repeated extractions with fresh liquid sulphurous acid is connected with loss of valuable ingredients of the original material, arising from the fact that to a certain degree saturated hydrocarbon products are extracted, such repeated extractions render the product more expensive, as the recovery of the large quantities of sulphurous acid required for the repeated operations is of itself very costly.

The main object of the invention is to provide a process which will allow the purification to be effected more completely and more economically.

With this object in view the invention consists in subjecting the primary materials to repeated extractions in one and the same vessel with liquid sulphurous acid saturated to different degrees with the resinifying materials which it is desired to remove, the first extraction being effected with a liquid sulphurous acid of the highest degree of saturation as compared with the saturation of the liquid sulphurous acid used for the subsequent extractions, which extractions are followed by a final extraction with pure liquid sulphurous acid. The final extraction may advantageously be effected in a separate vessel.

It will thus be seen that in the process according to the present invention for the first extraction a liquid sulphurous acid is used which already contains substances easily soluble in liquid sulphurous acid (unsaturated hydrocarbons) the removal of which is the object of the process, but which has also absorbed substances not so readily soluble in liquid sulphurous acid (saturated hydrocarbons) and the removal of which would be disadvantageous and uneconomical. In applying the invention to the purification of mineral oils of high boiling point, the first extraction may be effected by such liquid sulphurous acid which has already been used three times in preceding extractions; thereupon a second and third extraction are effected with liquid sulphurous acid that has been used twice and once respectively for the same purpose; the final treatment is then effected with unused liquid sulphurous acid, which after this final extraction is reserved for use in a following operation, as above described. In this manner an efficient separation into two parts is effected, the one part being soluble in liquid sulphurous acid (extract), and the other part being insoluble therein (refined product). However, the liquid sulphurous acid contains not only the materials that it is desired to remove (the unsaturated compounds) but also a certain proportion of the material it is desired to retain, and we have found that such liquid sulphurous acid has the property that when it is again brought into contact with the materials to be treated it removes the unsaturated compounds without being enriched in the compound it is desired to retain. Apart from the fact that an exhaustive purification of the mineral oils is thereby achieved, the quantity of liquid sulphurous acid to be evaporated is small as compared with the quantity of oil to be treated.

Any known form of apparatus can be used for carrying out the process, which comprises intermediate vessels for the various quantities of liquid sulphurous acid and corresponding conduits connected with the mixer.

Figure 2:
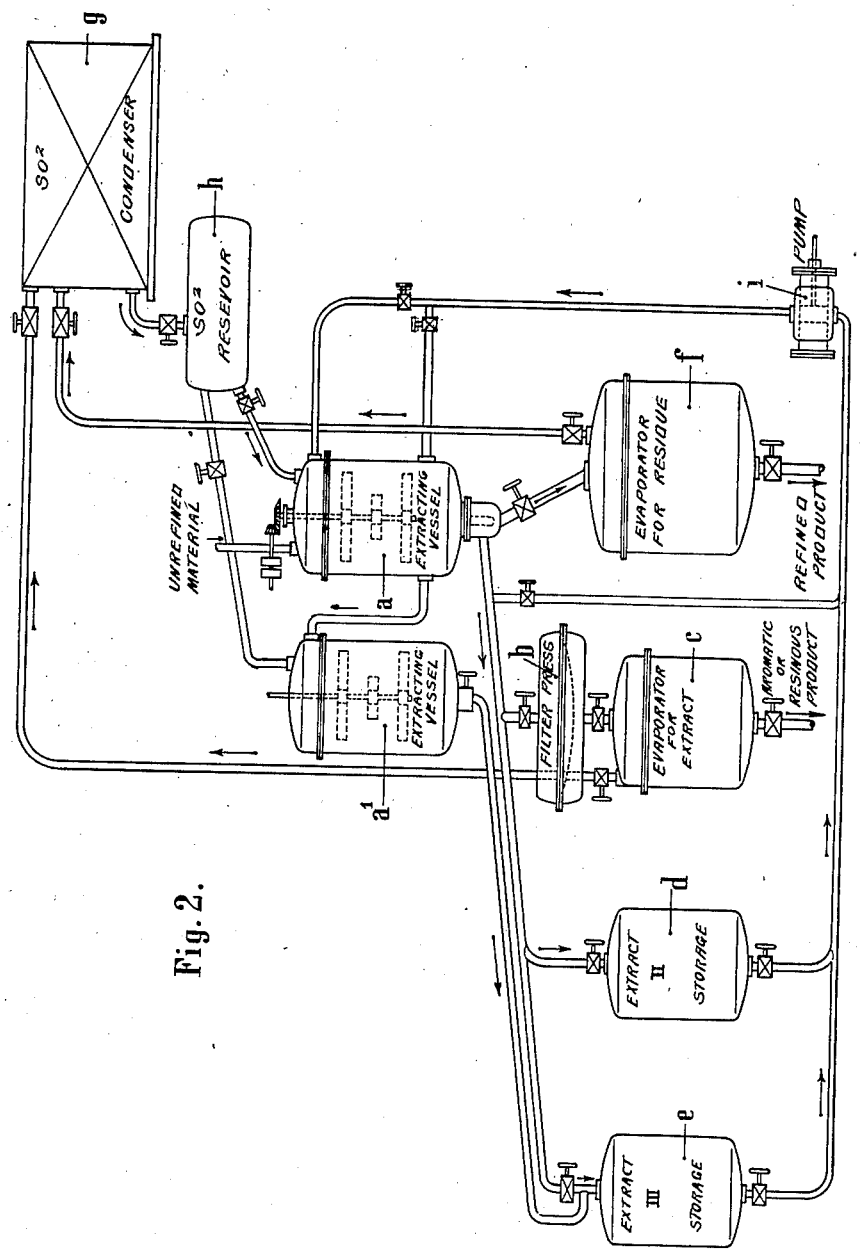

The accompanying drawings illustrate two forms of apparatus which can be used for this purpose; and Fig. 1 shows diagrammatically a form of apparatus in which all the extractions are effected in a single vessel, whilst Fig. 2 illustrates a modification in which the final extraction is effected in a separate vessel.

In the drawings, $a$ is the extracting vessel, $c$ the extract evaporator, $f$ the evaporator of the refined product; $d$ and $e$ are the vessels for storing the various extracts the number of which vessels may be increased if required; $g$ is a vessel in which the sulphurous acid gases coming from $c$ and $f$ are condensed; $h$ is a reservoir for the liquid sulphurous acid condensed in $g$; and $i$ is the pump by means of which the second and third extracts are conveyed from their respective reservoirs to the extracting vessel.

The improved process may be applied to the treatment of lubricating oil distillates containing large percentages of resinifying substances and satisfactory results have been obtained with a fourfold treatment with liquid sulphurous acid, the product of the extraction being free from resinifying substances and complying with the requirements for electrical transformer oil as regards tarry constituents.

The process is also suitable for purifying those distillates and oils which contain in addition to constituents soluble in liquid sulphurous acid, also constituents insoluble therein. Among such substances are, for instance, lignite tar oil, and particularly the product which remains during the gasification of the lignite at low temperatures. But also other products complying with the requirements above mentioned may be considered as suitable materials to be subjected to the purification process according to the present invention. Thus crude lignite tar is known to be rich in paraffin, which is insoluble in liquid sulphurous acid, while all the other constituents are soluble therein. In this case, owing to the low melting point of paraffin, the method can easily be worked as hereinafter explained.

The tar to be treated, or its distillate, is mixed in the extracting vessel $a$ with a large volume of liquid sulphurous acid, and cooled down to —10° C. After standing for some time the liquid is separated at the bottom and the solid fine crystals of paraffin float on the surface. The clear extract is then allowed to pass through the filter-press $b$ (the latter gathering solitary crystals) to the vaporizer $c$; the progress of the process can be followed through a glass window in the lower part of the vessel $a$. Subsequently another quantity of liquid sulphurous acid is admitted to the vessel $a$, the contents of which are stirred for a short time; then the lower layer, the so-called extract II, is passed into the reservoir $d$. It is not necessary to wait for the complete separation of the layers, and likewise the exact temperature to be maintained is also of little importance since this extract II will again be used in the following operation as extract I, and will thereby be cooled down again to —10°; it is therefore immaterial whether the extract takes or not with it, some of the paraffin either in consequence of incomplete separation or on account of the temperature being too high.

The liquid sulphurous acid is then passed into the container $a$ for a third time, but this time the contents are warmed up to 40° C. during the process of mixing. The paraffin melts to a clear layer and can thus be separated without difficulty from the extract III. The latter is passed into the reservoir $e$, while the paraffin flows into the vaporizer $f$. Extract III serves in the next operation as extract II.

The liquid sulphurous acid is expelled by heating from the extract vaporizer $c$ and the vaporizer $f$, reduced pressure being applied towards the end of the evaporation; the products thus obtained viz: the paraffin-free extract and the paraffin itself, are then removed in the usual way.

Instead of heating the contents of the container $a$ to 40° C. in the final extraction for the purpose of melting the paraffin and separating it from the extract III, such heating at 40° C. may be effected in the first or at least the second extraction. This, however, is impracticable in treating oils containing paraffin because the liquid sulphurous acid, mixed with the soluble oil constituents, exhibits a strong capacity for dissolving paraffin at increased temperature. Consequently a comparatively large quantity of paraffin would be dissolved with that particular extract. In contradistinction thereto, extract III which contains only a small portion of oil, i. e. consisting almost entirely of liquid sulphurous acid, dissolves only a small quantity of paraffin even at 40° C.

When the operations are effected in quick succession there may be loss of time since the extracting container is correspondingly heated, through the heating of extract III to 40° C. and subsequently has first to be cooled down to —10 C. for extract I of the following operation.

In order to avoid this, a second extracting vessel $a^1$ may be added, into which the contents of the vessel $a$ are introduced or drawn in by means of the gas pump, while in the second container $a^1$ (Fig. 2)—which is similar to the container $a$—the treatment with liquid sulphurous acid is applied at 40° C., so that it is not necessary to warm $a$. The second container $a^1$ must be suitably connected to the rest of the apparatus by means of the necessary conduits.

The process may also be applied to the extraction of pure anthracene from crude anthracene as used in commerce, whereby without much loss of anthracene a 92–94% pure anthracene can be extracted from the commercial anthracene containing only 40% of pure anthracene.

In this case, the production of the final extraction differs from the extraction of paraffin, since the high melting point of anthracene does not allow it to be melted in the apparatus. The removal of the anthracene from the mixer to the vessel intended for the evaporation and complete expelling of the liquid sulphurous acid, is best effected by washing under stirring, with the addition of some unused liquid sulphurous acid.

The separation of crude Montan wax into pure Montan wax and Montan resin, can also be effected by means of the process according to the present invention. Montan resin is soluble in liquid sulphurous acid, pure Montan wax, however, is almost insoluble. Therefore by treating the pulverized crude Montan wax in the manner above described, the separation can be effected without difficulty; the removal of the final extraction of Montan wax from the mixer is effected in the same manner as prescribed for anthracene.

The examples hereinbefore described, show the many possible applications of the process according to the present invention. All solid bodies which are lighter than liquid sulphurous acid can be treated similarly to crude anthracene and Montan wax; oils containing both solid constituents insoluble in liquid sulphurous acid and liquid constituents which are soluble, are treated in the same manner as described in connection with crude tar.

Advantages of the improved process are, first, that the temperature and pressure conditions in the extracting vessel or vessels may be controlled independently for the crude material and for each successive portion of extract treated; second, the loss of saturated hydrocarbon compounds carried off in the extract in the treatment after the first addition of sulfurous acid is negligible because the acid is already carrying its capacity and gives back to the product in the extracting vessel as much as it dissolves of such compounds; third, the volume of spent acid that must be vaporized, exhausted and condensed is diminished by two-thirds or more, depending upon the number of portions of extract stored for re-use, and the volume of fresh sulfurous acid needed for complete separation of the aromatic and resinous unsaturated compounds from the clear saturated compounds is correspondingly less than heretofore required, thereby reducing the cost of the treatment; and fourth, the output and purity of the refined product is greater for the same capacity plant.

Claims.

1. The process of separating hydrocarbons into a part soluble in liquid sulphurous acid and a part insoluble or hardly soluble in the same by dividing the material into portions for successive treatment which comprises the step of bringing liquid sulphurous acid at a temperature well below its vaporization point, which has already been in contact with a portion of the primary material and contains not only constituents of the first-named part but also constituents of the second-named parts, again into contact with another portion of the primary material fresher than that with which said acid has already been in contact whereby unsaturated compounds of the first-named part are removed from said fresher portion without removing therefrom compounds of the second-named part.

2. The process of separating undesired ingredients from hydrocarbons by means of liquid sulphurous acid which consists in the systematic subjection of the primary material to extraction in batches at a temperature well below the vaporization point of sulphurous acid in a number of successive stages with mother liquors arising from previous extractions of different degrees of saturation commencing with a liquor having the highest degree of saturation followed by a final extraction with pure liquid sulphurous acid, whereby the loss of hydrocarbons in solution with said undesired ingredients is lessened.

3. The process of purifying the liquid parts and of separating solid compounds in a purified state from complex hydrocarbon products by means of liquid sulphurous acid characterized by the primary material being systematically extracted in batches at a low temperature in several successive stages with mother liquors arising from previous extractions of different degrees of saturation beginning with that most highly saturated with extracted substances, and finally with pure liquid sulphurous acid, whereby the loss of desirable components is lessened, substantially as described.

4. The process of separating paraffin from lignite tar or its distillate which consists in mixing a relatively large volume of liquid sulphurous acid with the primary material in an extracting vessel cooling down the mixture and allowing it to stand removing the clear extract through a filter to a vaporizer, subsequently adding a second quantity of liquid sulphurous acid to the vessel stirring the mixture and subsequently removing the lower layer and storing the same, adding a third quantity of liquid sulphurous acid to the vessel and warming the mixture while stirring removing the extract and separately storing it passing the clear layer of paraffin to a second vaporizer expelling the liquid sulphurous acid from both vaporizers by heating and in subsequent operations utilizing in each succeeding operation the extract first stored in the previous operation for the first extraction and the secondly stored extract for the second extraction.

5. The process of separating paraffin from lignite tar or its distillate which consists in mixing a relatively large volume of liquid sulphurous acid with the primary material in an extracting vessel cooling down the mixture to —10° C. approximately, and allowing it to stand, removing the clear extract through a filter to a vaporizer, subsequently adding a second quantity of liquid sulphurous acid to the vessel stirring the mixture and subsequently removing the lower layer and storing the same, adding a third quantity of liquid sulphurous acid to the vessel and warming the mixture to approximately 40° C. while stirring removing the extract and separately storing it passing the clear layer of paraffin to a second vaporizer expelling the liquid sulphurous acid from both vaporizers by heating and in subsequent operations utilizing in each succeeding operation the extract first stored in the previous operation for the first extraction and the secondly stored extract for the second extraction.

6. The process of separating paraffin from lignite tar or its distillate which consists in mixing a relatively large volume of liquid sulphurous acid with the primary material in an extracting vessel cooling down the mixture and allowing it to stand, removing the clear extract through a filter to a vaporizer, subsequently adding a second quantity of liquid sulphurous acid to the vessel stirring the mixture and subsequently removing the lower layer and storing the same, removing the remainder from said extracting vessel to a second extracting vessel, adding a third quantity of liquid sulphurous acid to said second extracting vessel and warming the mixture while stirring removing the extract and separately storing it passing the clear layer of paraffin to a second vaporizer expelling the liquid sulphurous acid from both vaporizers by heating and in subsequent operations utilizing in each succeeding operation the extract first stored in the previous operation for the first extraction and the secondly stored extract for the second extraction.

7. The process of separating hydrocarbons into a part soluble in liquid sulphurous acid and a part insoluble or hardly soluble in the same which consists in mixing a relatively large volume of liquid sulphurous acid with the primary material in an extracting vessel, cooling down the mixture and allowing it to stand, removing the extracting vessel, cooling down the mixture and allowing it to stand, removing the extract to a vaporizer, subsequently adding a second quantity of liquid sulphurous acid to the vessel, stirring the mixture and subsequently removing the extract and separately storing the same, washing and removing the insoluble part from the vessel to a second vaporizer, expelling the liquid sulphurous acid from both vaporizers by heating and in subsequent operations utilizing in each succeeding operation the extract first stored in the previous operation for the first extraction and pure liquid sulphurous acid for the final extraction.

8. The process of separating hydrocarbons into a part soluble in liquid sulphurous acid and a part insoluble or hardly soluble in the same which consists in mixing a relatively large volume of liquid sulphurous acid with the primary material in an extracting vessel, cooling down the mixture and allowing it to stand, removing the extract to a vaporizer, subsequently adding a second quantity of liquid sulphurous acid to the vessel, stirring the mixture and subsequently removing the lower layer and storing the same separately, adding a third quantity of liquid sulphurous acid to the vessel and stirring the mixture, removing the extract and separately storing the same, washing and removing the insoluble part from the vessel, to a second vaporizer, expelling the liquid sulphurous acid from both vaporizers by heating and in subsequent operations utilizing in each succeeding operation the extract first stored in the previous operation for the first extraction and the secondly stored extract for the second extraction.

9. The process of separating hydrocarbons into a part soluble in liquid sulphurous acid and a part insoluble or hardly soluble in the same which consists in mixing a relatively large volume of liquid sulphurous acid with the primary material in an extracting vessel cooling down the mixture and allowing it to stand, removing the clear extract through a filter to a vaporizer, subsequently adding a second quantity of liquid sulphurous acid to the vessel, stirring the mixture and subsequently removing the extract layer and storing the same, removing the remainder from said extracting vessel to a second extracting vessel, adding a third quantity of liquid sulphurous acid to said second extracting vessel and warming the mixture while stirring, removing the extract and separately storing it, passing the layer of insoluble residue to a second vaporizer, expelling the liquid sulphurous acid from both vaporizers by heating and in subsequent operations utilizing in each succeeding operation the extract first stored in the previous operation for the first extraction and the secondly stored extract for the second extraction.

In testimony whereof they have signed their names to this specification.

L. EDELEANU.
Dr. WILHELM HESS.

Witnesses:
LAURENCE A. HANSEN,
R. T. AUSPEED.